United States Patent [19]

Shiga

[11] 4,228,471
[45] Oct. 14, 1980

[54] APPARATUS FOR SEARCHING A PIECE OF INFORMATION RECORDED ON A MAGNETIC TAPE

[75] Inventor: Takashi Shiga, Yokohama, Japan

[73] Assignee: Victor Company of Japan, Limited, Yokohama, Japan

[21] Appl. No.: 966,375

[22] Filed: Dec. 4, 1978

[30] Foreign Application Priority Data

Dec. 5, 1977 [JP] Japan .................................. 52/145840

[51] Int. Cl.² ...................... G11B 15/48; G11B 15/18
[52] U.S. Cl. ..................................... 360/73; 360/72.1
[58] Field of Search ......................... 360/73, 72.1, 137

[56] References Cited

U.S. PATENT DOCUMENTS

| | | | |
|---|---|---|---|
| 3,505,485 | 4/1970 | Andrews | 360/73 |
| 4,048,659 | 9/1977 | Fink et al. | 360/73 |

*Primary Examiner*—Robert S. Tupper
*Attorney, Agent, or Firm*—Lowe, King, Price & Becker

[57] ABSTRACT

Apparatus and method for determining if a particular piece on a magnetic recording medium is to be played back or not. The medium includes plural pieces having starting locations randomly positioned and spaced along the length of the medium. Successive pieces from the medium are played back at higher speed than one can be perceived by an operator. From each piece played back at the higher speed there is sensed when a magnetic flux transition to none of the flux variations occurs between the end of each piece and the beginning of the next piece. In response to the sensed transition the speed of the medium is reduced to a normal playback speed for the operation. The normal playback speed is maintained for a predetermined interval at the beginning of the next piece. The interval is long enough to enable the operator to make a decision regarding the next piece. When the interval is completed, high speed playback is normally automatically resumed until the completion of the next piece.

14 Claims, 4 Drawing Figures

APPARATUS FOR SEARCHING A PIECE OF INFORMATION RECORDED ON A MAGNETIC TAPE

FIELD OF THE INVENTION

This invention generally relates to a control system for the driving mechanism of a tape player. More specifically, the present invention relates to an apparatus for searching a piece of music recorded on a magnetic tape.

BACKGROUND OF THE INVENTION

When it is desired to search a piece of information such as a piece of music from a plurality of pieces of information recorded on a magnetic tape, the operator of the tape player operates various keys or switches, such as a playback key, fast forward key, rewinding key repeatedly. The operator (listener) of the tape player listens to each reproduced pieces of information to see whether or not the reproduced information is the one that he or she wishes to hear. This operation of the keys of tape player is usually troublesome and is time consuming.

To remove the above-mentioned troublesome operation in searching a piece of information, it is known to record a series of marker signals on the magnetic tape to indicate each position of pieces of information. These marker signals are reproduced separately from the signals corresponding to the recorded information at high speed by a tape player equipped with a conventional searcing device. However, it is required to record such series of marker signals, in addition to the information signals prior to the search operations.

Further, the method of recording the marker signals and searching the position of a piece of information by finding a marker signal is not uniform for casset tape players in which compact cassetts (trademark) tapes are used. Consequently, there is no interchangeability between cassette tapes recorded by different methods.

Moreover, such device for searching a piece of information by finding a marker signal is complex in construction and therefore, such device is expensive.

Apart from the above described conventional system, U.S. Pat. No. 3,505,485 discloses a tape reeling search system with a transistor search amplifier. According to the published specification, the magnetic tape is driven at high speed to the end of a piece of information or music and then the reeling operations are changed automatically from the high speed reeling to the normal playback operation by detecting a no signal portion between pieces of information. However, according to this search system, the operator must operate a key or a button to reestablish the high speed(fast forward) reeling operation each time it is desired to skip the remaining portion of a piece of information.

SUMMARY OF THE INVENTION

The present invention has been achieved in order to eliminate above-mentioned drawbacks of the conventional device for searching a piece of information prerecorded on a magnetic tape. No marker signals are required to be recorded on a magnetic tape, while each piece of information is detected at the beginning and the end thereof. Each piece of information is reproduced from the beginning thereof for a predetermined period of time and the remaining portion of the piece of information is skipped so that the listener is able to listen to the next piece of information with a short period of time. This listen-skip-listen operation is automatically and repeatedly performed until a desired piece of information is found.

It is therefore, an object of the present invention to provide an apparatus for searching a piece of information recorded on a magnetic tape, in which search operation is performed without marker signals.

Another object of the present invention is to provide such a system in which search operation is performed readily.

A further object of the present invention is to provide such a system in which search operation is carried out with a short period of time.

BRIEF DESCRIPTION OF THE DRAWINGS

These and other objects and features of the present invention will become more readily apparent from the following detailed description of the preferred embodiment taken in conjunction with the accompanying drawings in which.

DETAILED DESCRIPTION OF THE PREFERRED EMBODIMENT

Figure 1:
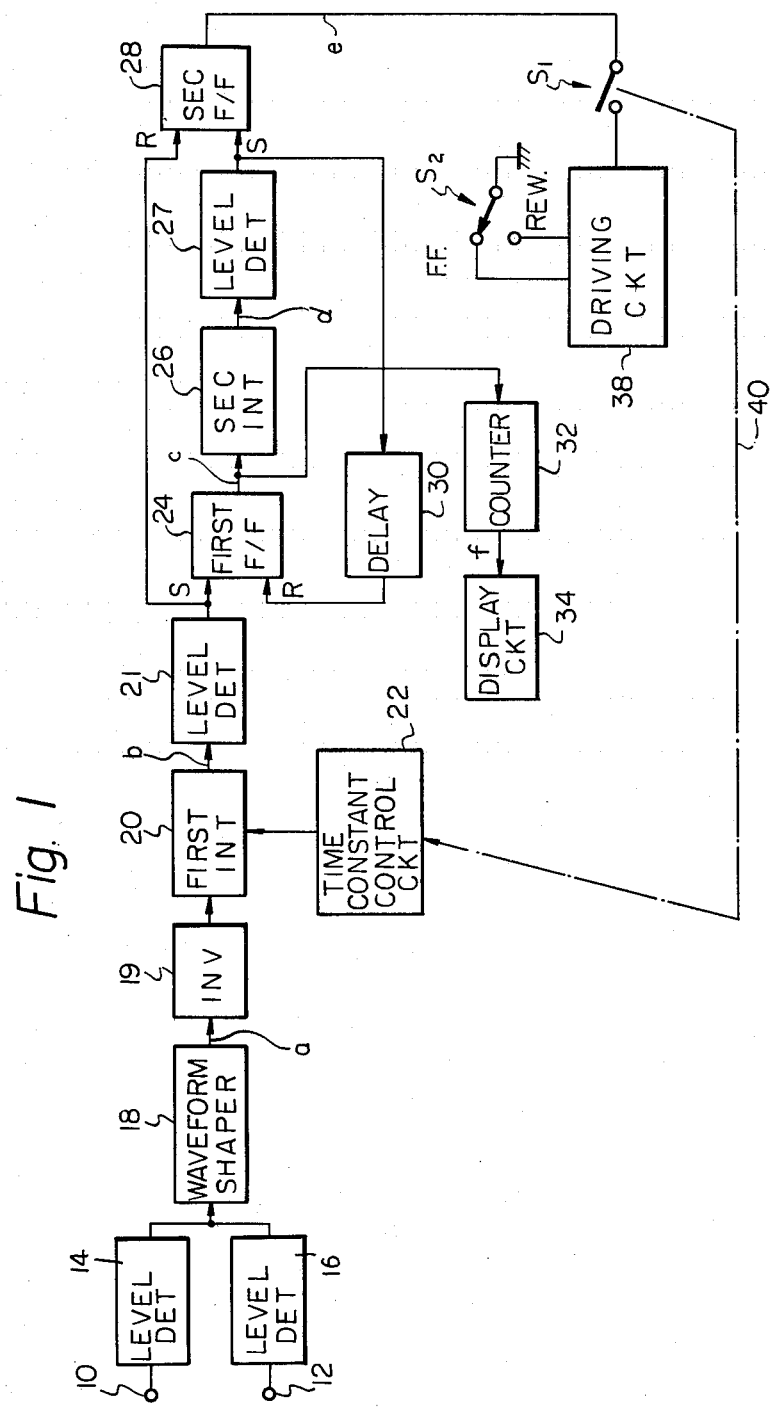
FIG. 1 is a schematic block diagram of a preferred embodiment of the apparatus according to the present invention.

FIG. 1 is a schematic block diagram of a preferred embodiment of the apparatus for searching a piece of music recorded on a magnetic tape according to the present invention. The apparatus shown in FIG. 1 is used in combination with a suitable tape player (not shown). The tape player may be any one of conventional devices, which has a payoff reel, a take-up reel and a tape driving mechanism. A reproduce head is provided for scanning the magnetic tape to pick up audio signals. In a conventional tape player a lift-up device is usually provided for lifting the magnetic tape up so as to space the magnetic tape from the reproduce head when the tape is driven at high speed during fast forward reeling and rewinding. In the present invention, however, the lift-up device, if provided, is disabled so that the magnetic tape moves on the surface of the reproduce head when driven at high speed.

The circuit arrangement includes first and second level detectors 14 and 16 respectively connected input terminals 10 and 12, a waveform shaper 18, an inverter 19, first and second integrators 20 and 26, two level detectors 21 and 27, first and second flip-flops 24 and 28, a time constant control circuit 22, a delay circuit 30, a counter 32, a display circuit 34, first and second switches $S_1$ and $S_2$, and a driving circuit 38.

The first and second input terminals 10 and 12 are respectively responsive to signals of left and right channels, reproduced from a magnetic tape. The first and second level detectors 14 and 16 respectively produce output signals when the magnitude of the input signal is over a predetermined value. The outputs of the first and second level detectors 14 and 16 are connected to an input of the waveform shaper 18 so that the output signals of the first and second level detectors 14 and 16 are added to each other and the waveform of the added signal is shaped. The output of the waveform shaper 18 is connected via the inverter 19 to an input of the first integrator 20. The time constant control circuit 22 controls the time constant of the first integrator 20. Depending upon the operational condition of the first switch $S_1$, circuit 22 selects one time constant, from first and second time constants the values of which are respectively such as 0.1 second and 2 seconds. The output of the first integrator 20 is connected via the level detector 21 to a first inputs of the first flip-flop 24, and to a second input (R) of the second flip-flop 28. The output of the first flip-flop 24 is connected to an input of the second integrator 26 the output of which is connected via another level detector 27 to a first inputs of the second flip-flop 28 and to an input of the delay circuit 30. The output of the delay circuit 30 is connected to a second input of the first flip-flop 24. The output of the first flip-flop 24 is further connected to an input of the counter 32 the output of which is connected to an input of the display circuit 34. The output of the second flip-flop 28 is connected via the first switch $S_1$ to an input of the driving circuit 38. The first switch $S_1$ is provided for controlling the search operation by changing the reeling operation of the tape player (not shown) from a normal playback mode to a high speed playback mode and vice versa. The second switch $S_2$ is provided for selecting one of fast forward (F.F.) driving and rewinding (fast reverse reeling) operations for the high speed playback mode.

The function and operation of the circuit shown in FIG. 1 are described hereinafter in connection with the waveforms shown in FIG. 2.

It is assumed that a plurality of pieces of music is prerecorded on a magnetic tape. The search of a piece of music is started from the initial portion of the magnetic tape. The operator closes the first switch $S_1$ and turns the second switch $S_2$ to the F.F. (fast forward) side. Signals of the left and right channels reproduced by the reproduce heads are applied via suitable amplifiers to the first and second input terminals 10 and 12. The left and right channel signals are respectively detected by the first and second level detectors 14 and 16 and then the output signals of the level detectors 14 and 16 are mixed. The mixed signal is fed to the waveform shaper 18 in which the waveform of the mixed signal is shaped. The output signal of the waveform shaper 18 is denoted by a rectangular waveform "a" in FIG. 2. Although the actual waveform of the output signal of the waveform shaper 18 includes ripple components, the waveform is shown in the form of a direct current, rectangular waveform for the purpose of schematical illustration. As indicated in FIG. 2, three pieces of music are prerecorded on a magnetic tape. The first piece of music starts at time $t_0$ and ends at time $t_3$, while the second piece of music starts at time $t_5$ which follows time $t_3$. In response to audio signals during playing back of the first, second and third pieces of music, the output signal of the waveform shaper 18 assumes a logic "1" (high) level. During a period of time between two pieces of music no audio signal is applied to the input terminals 10 and 12. Therefore, the output signal of the waveform shaper 18 assumes a logic "0" (low) level.

The output waveform "a" of the waveform shaper 18 is applied via the inverter 19 to an input of the first integrator 20. In response to a leading edge and a binary one level of signal waveform "a", the output of first integrator 20 is a short circuited; integrator 18 derives output waveform "b", FIG. 2. In response to the leading positive going edge of waveform "a", the output signal of the first integrator 20 assumes a logic "0" (low) level at time $t_0$. The level of the output waveform "b" of the first integrator 20 is detected by level detector 21, which is arranged to produce a high level signal when the level of the first integrator 20 is greater than a predetermined value. The output waveform "b" of the first integrator 18 is supplied via the level detector 21 to a set terminal "S" of the first flip-flop 24 and a reset terminal "R" of the second flip-flop 28.

The first flip-flop 24 is triggered to be set in response to the trailing, negative going edge of waveform "b" at time $t_0$ and thus the output waveform "c" of the first flip-flop 24 assumes a high level. The output waveform "c" of the first flip-flop 24 is fed to the second integrator 26 and the counter 32. The second integrator 26 integrates the waveform "c" from time $t_0$ and thus an output waveform "d" is obtained at the output terminal of the second integrator 26. As shown in FIG. 2, the magnitude of the waveform "d" increases from time $t_0$. The output waveform "d" of the second integrator 26 is supplied via another level detector 27 to a set terminal "S" of the second flip-flop 28 and an input of the delay circuit 30. The output of the delay circuit 30 is connected to a reset terminal "R" of the first flip-flop 24 so as to feed the waveform "d" with a predetermined time delay as a reset signal to the first flip-flop 24. The counter 32 is responsive to positive going leading edges of the output signal "c" of the first flip-flop 24 and is arranged to produce a pulse signal "f" in response to each leading edge of the signal "c". Hence, counter 31 counts the number of the pulses "f" and produces an output signal indicative of the number of pulses. The output signal of the counter 32 is applied to a display circuit 34 so that a numeral corresponding to the number of pulses is displayed. It will be understood that the display circuit 34 displays the numeral "1" when the first piece of music is played back(reproduced).

The second flip-flop 28 is set when the magnitude of waveform "d" of the second integrator 26 reaches a predetermined level at time $t_1$, ten seconds after time $t_0$. To this end, level detector 27 responds to the level of the output signal "d" of the second integrator 26 rising to a predetermined level, to produce a pulse that activates the second flip-flop 28 into a high level at time $t_1$, as indicated by rectangular waveform "e". The output signal "e" of the second flip-flop 28 is transmitted via the first switch $S_1$ to the driving circuit 28 and thus reeling operation of the tape recorder is changed from the playback operation to the fast forward reeling when the output signal "e" of the second flip-flop 28 becomes a high level at time $t_1$. After time $t_1$, the delay circuit 30 supplies the output signal "d" of the second integrator 26 with a time delay of two seconds to the reset terminal "R" of the first flip-flop 24. Therefore, the first flip-flop 24 is reset at time $t_2$ which is twelve seconds after time $t_0$ so as to be in a waiting condition for the second piece of music.

When the magnetic tape is wound by the fast forward reeling operation from time $t_1$, the output signal "a" of the waveform shaper 18 remains at a logic "1" (high) level since the audio signals are continuously reproduced. At time $t_3$, however, the output signal "a" of the waveform shaper 18 becomes a low level because no signal is reproduced between time $t_3$ and time $t_5$. In response to a low level of waveform "a" the magnitude of the output signal "b" of the first integrator 20 exponentially increases from time $t_3$. The level of the signal "b" exponentially increases from the low level and exceeds the high level at time $t_4$ which is 0.1 second after time $t_3$. The second flip-flop 28 is triggered to be reset by the high level waveform "b" from the first integrator 20 at time $t_4$. When the level of the signal "e" from the second flip-flop 28 changes from high to low, the reeling operations of the tape recorder are changed from the fast forward reeling to the normal playback operation at time $t_4$. The time constant of the first integrator 20 is determined by the time constant control circuit 22 which is responsive to the first switch $S_1$ as shown by a dot-dash line 40 in FIG. 1. During the period of time between time $t_4$ and time $t_5$ no audio signal is reproduced when the tape recorder is in normal playback operation.

At time $t_5$, when the audio signals of the second piece of music in the left and right channels are detected by the level detectors 14 and 16 in the same manner as in the first piece of music, the output signal "a" of the waveform shaper 18 assumes a logic "1" (high) level, the output signal "b" of the first integrator 20 assumes a logic "0" (low) level. Accordingly, the first flip-flop 24 is set at time $t_5$ and thus the counter 32 counts the second pulse "f" to produce an output signal indicative of the number, i.e. two. The display circuit 34 displays a numeral "2" for indicating that the tape recorder is reproducing the second piece of music. In response to the high level signal from the first flip-flop 24, the second integrator 26 produces an output signal "d" the magnitude of which exponentially increases from time $t_5$. At time $t_6$, i.e. ten seconds after time $t_5$, the level of the output signal "d" of the second integrator 26 reaches a logic "1" (high) level and thus the second flip-flop 28 is set. The output signal "e" of the second flip-flop 28 returns to a high level at time $t_6$ and thus the reeling operation of the tape recorder is switched from the normal playback operation to the fast forward reeling. The fast forward reeling finishes at time $t_7$ and then the normal playback starts so as to be able to reproduce the third piece of music at the normal speed.

Figure 2:
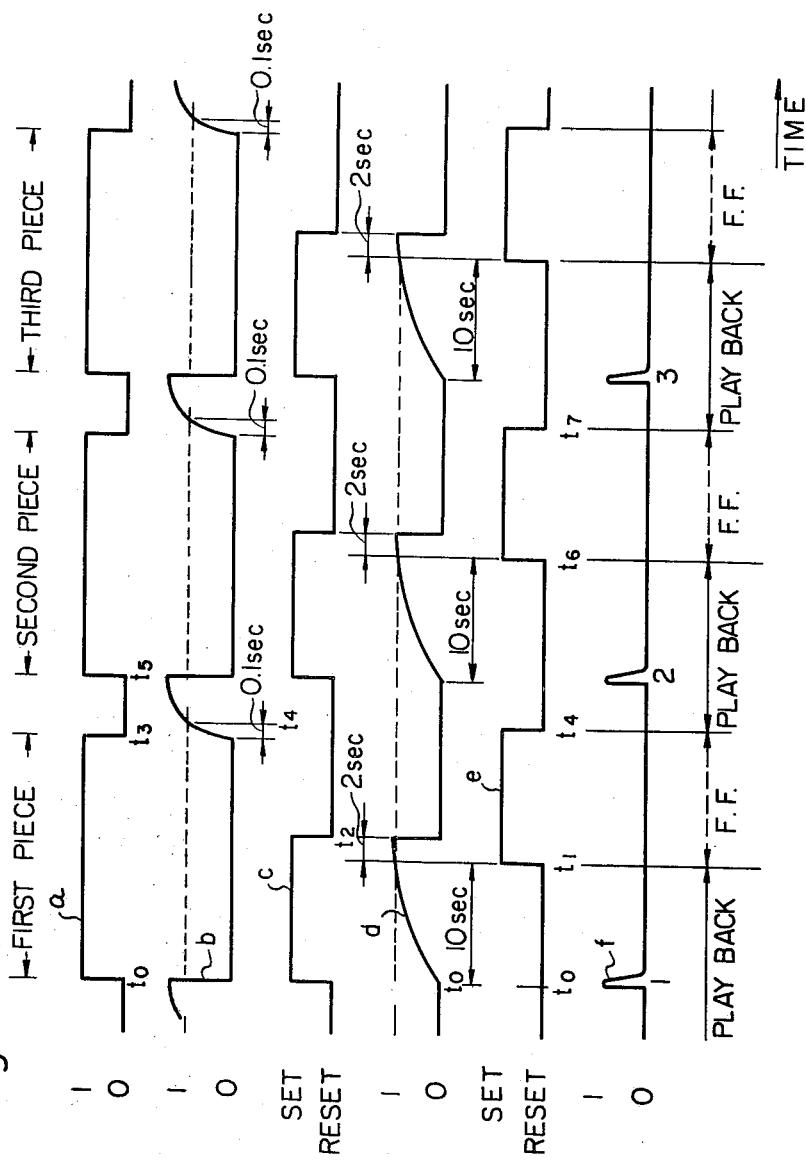
FIG. 2 is a series of waveforms for various signals produced in the circuit shown in FIG. 1.

As shown in FIG. 2, the following pieces of music are succeedingly reproduced. It is to be noted that each of the piece of music in the series is reproduced by the tape player for only the ten seconds corresponding to the beginning of each piece of music. The operator of the tape recorder, i.e. the listener, ascertains whether the reproduced music is the one that he or she desires to select or not. When a desired piece of music is reproduced, the operator turns off the first switch $S_1$ so that the output signal "e" from the second flip-flop 28 is not applied to the driving circuit 38. Therefore, the normal playback operation is maintained and thus the listener of the music is able to enjoy listening the selected piece of music from the beginning to the end thereof. Meanwhile since the time constant control circuit 22 is responsive to the operation of the first switch $S_1$, the time constant of the first integrator 20 is changed from 0.1 second to 2 seconds when the first switch $S_1$ is turned off. Therefore, when the reproducing operation of the selected piece of music ends, the output signal "b" of the first integrator 20 becomes a logic "1" (high) level two seconds after the end of the selected piece of music. Because of the time constant of the first integrator 20, the output signal of the first integrator 20 does not become a logic "1" (high) level when no signal is reproduced by the tape recorder due to the drop output phenomena, silent portion in a piece of music, and/or a temporary failure of the tape driving mechanism. Since a period of time corresponding to a drop out portion on a magnetic tape under a normal playback operation is much longer than that under a fast forward reeling, a short portion of the time constant of the first integrator 20 is apt to cause the apparatus to perform a malfunction. In other words, the drop out portion may be detected as the end of a piece of music since no signal is reproduced when the head of the tape player scans the drop out portion. Generally, the period of time between two pieces of music is about three seconds when reproduced at the normal speed, while the tape speed during the fast forward reeling is about 20 times higher than the case of normal playback operation. Therefore, the time constant of the first integrator 20 is so set that the aforementioned time delays of 0.1 second and 2 seconds respectively for the high speed reeling (fast forward and rewinding) and the normal playback operation, are provided.

Figure 3:
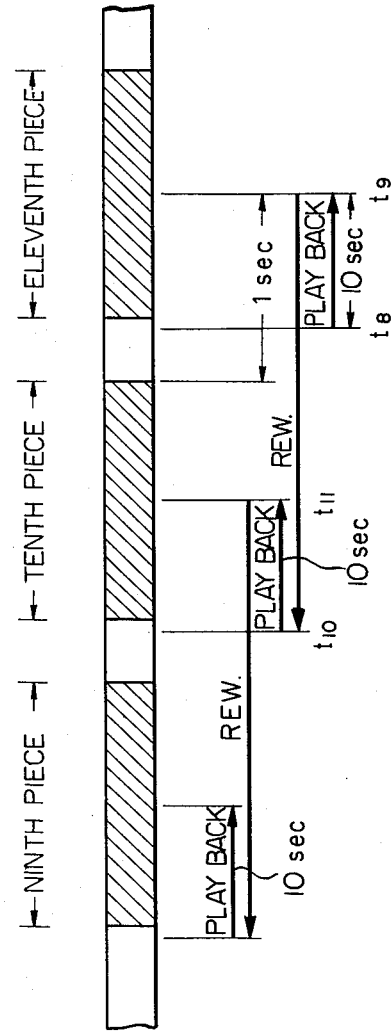
FIG. 3 is a schematic view of a magnetic tape on which pieces of information are recorded.

In the above described operation of searching and selecting a piece of music, the search is started from the first piece of music. However, it is possible to search a piece of music in the opposite direction, i.e. for instance from the last piece of music, as will be described hereinafter in connection with FIG. 3, a schematic view of a magnetic tape on which pieces of music are prerecorded. FIG. 3 further illustrates the relationship between the tape driving operations with respect to the moving tape. Although reference times are shown in FIG. 3, these times are not arranged along a time axis since the tape is driven back and forth as will be described hereinafter.

It is assumed that the magnetic tape on which ten pieces of music are prerecorded is in the take-up reel while the remaining portion of the magnetic tape on which pieces of music from the eleventh piece of music to the last piece of music are prerecorded is in the payoff reel. The operator of the tape recorder turns on the first switch $S_1$ and turns the second switch $S_2$ to the REW(rewinding) side to start searching a desired piece of music. The eleventh piece is reproduced at the normal playback speed for ten seconds from time $t_8$ to time $t_9$ as shown in FIG. 3. At time $t_9$, the second flip-flop 28 is set in the same manner as in the above described operation, and thus the output signal "e" of the second flip-flop 28 assumes a high level. The high level signal "e" is fed via the first switch $S_1$ to the driving circuit 38 so that the reeling operation of the tape recorder is changed to the REW(rewinding) operation. When rewinding operation is performed, the no signal portion between the eleventh and tenth pieces is reproduced. Because of the no signal portion on the magnetic tape, the output signal "a" of the waveform shaper 18 assumes a logic "0" (low) level so that the level of the output signal "b" of the first integrator 20 starts increasing so as to reset the second flip-flop 28, while the first flip-flop 24 is maintained in its set condition. However, it is to be noted that the period of time required for rewinding the initial portion of the eleventh piece of music and the no signal portion between the eleventh and tenth pieces, which is approximately one second, is shorter than the two second time delay of delay circuit 30. When the output voltage of the second integrator 26 reaches the high level at time $t_9$, and the output of the level detector 27 turns high at the same time $t_9$, the high level output of the level detector 27 is not transmitted to the reset terminal R of the first flip-flop 24, while the magnetic tape is rewound as far as the end portion of the tenth piece of music, due to the time delay of two seconds. Therefore, the rewinding operation is maintained irrespective of the presence of the no signal portion between pieces of music. When a portion of the magnetic tape corresponding to the tenth piece of music is reeled in the payoff reel and then the no signal portion between the tenth and ninth pieces of music is reproduced, the second flip-flop 28 is reset at time $t_{10}$ in response to the leading edge of the output signal "b" of the first integrator 20 since the first flip-flop 24 has been reset prior to time $t_{10}$. The tenth piece is reproduced from the initial portion thereof for ten seconds in the same manner as in the case of the eleventh piece. At time $t_{11}$ the rewinding operation starts and the magnetic tape is reeled in the payoff reel as far as the initial portion of the ninth piece of music.

In the same manner the initial portions of each of the following pieces of music are reproduced while the remaining portions of the pieces of music are skipped. The operator of the tape recorder listen to each initial portion of each piece of music to find a desired one. When the operator finds a desired piece of music, he or she turns off the first switch $S_1$ so as to maintain the normal playback operation to continuously listen to the selected piece of music.

When it is desired to listen to all of the music pieces from the beginning of the tape without searching by specific piece, the operator leaves the first switch $S_1$ open. When the first switch $S_1$ is turned off, the circuit shown in FIG. 1 functions in a similar manner to the above described operation. It will be understood that the normal playback operation is continuously performed since the output signal "e" of the second flip-flop 28 is not applied to the driving circuit 38. Meanwhile, the display circuit 34 displays the number of pieces of music in accordance with the output signal of the first flip-flop 24 in order.

Figure 4:
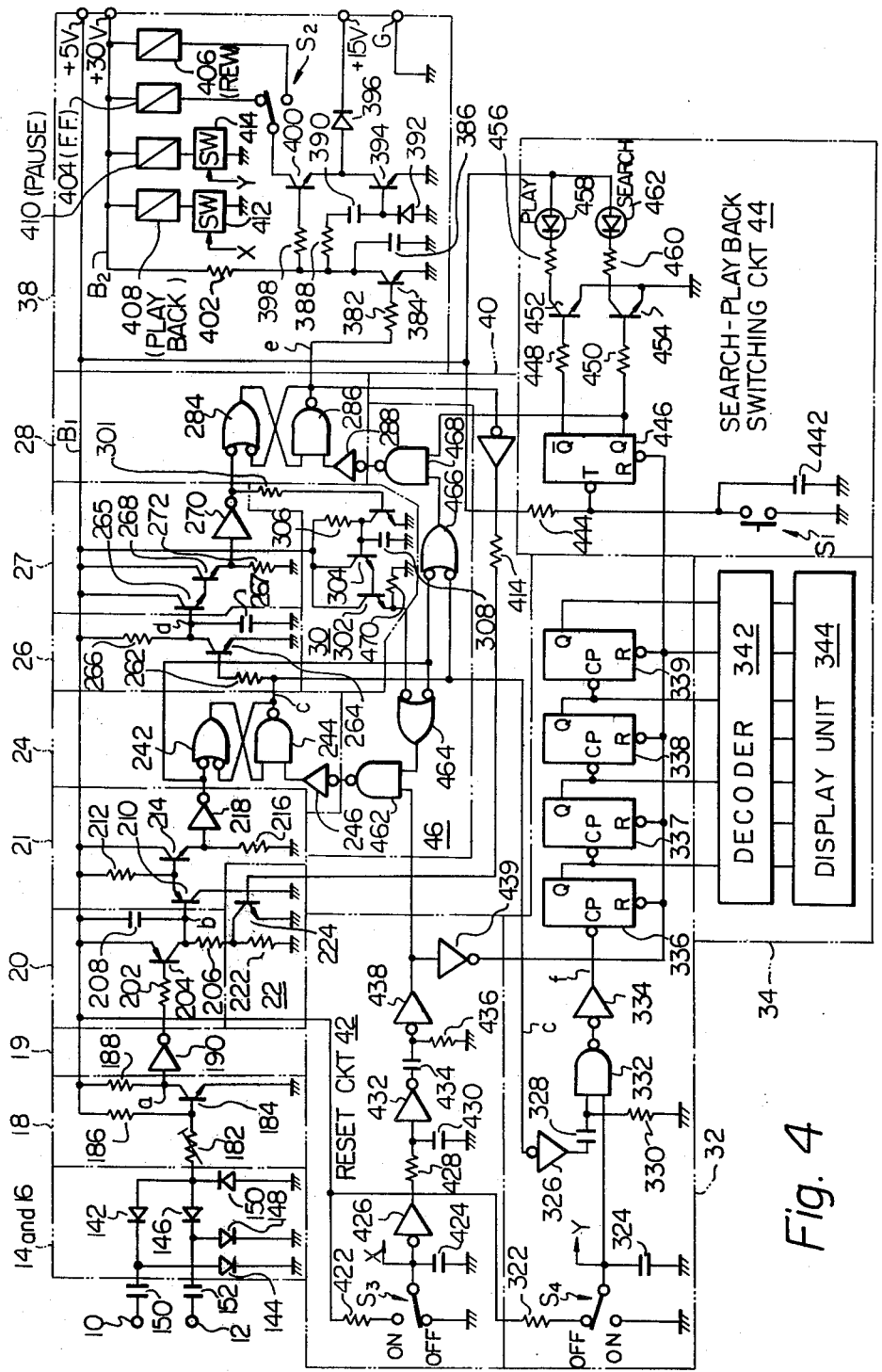
FIG. 4 is a detailed circuit diagram of the preferred embodiment of the block diagram shown in FIG. 1.

The operation of the preferred embodiment will be further described with respect to a detailed circuit diagram shown in FIG. 4.

FIG. 4 is a detailed circuit diagram of the preferred embodiment of the apparatus for searching a piece of music from a magnetic tape. Most of the blocks indicated by two-dot-dash lines in FIG. 4 generally correspond to each of the elements shown in FIG. 1, while several blocks are additionally provided. In other words, the circuit arrangement shown in FIG. 4 includes all of the blocks shown in FIG. 1 and a reset circuit 42, search-playback switching circuit 44 and auxiliary logic gate circuits 40 and 46. The similar circuits and elements are designated by the same numerals and references.

The first input terminal 10 responsive to the left channel signal is connected via a capacitor 150 to a cathode of a first diode 142, and an anode of a second diode 144 which constitute the first level detector 14. The second input terminal 12 is connected via a capacitor 152 to a cathode of a third diode 146 and an anode of a fourth diode 148 which constitute the second level detector 16. The cathode of the second and fourth diodes 144 and 148 are connected to ground, while the anodes of the first and third diodes 142 and 146 are connected to a cathode of a fifth diode 150, the anode of which is connected to ground. The anode of the first and third diodes 142 and 146 are further connected via a variable resistor 182 to a base of a transistor 184, the emitter of which is connected to ground. A resistor 186 is interposed between the base of the transistor 184 and a positive bus line $B_1$, which will be referred to as a first bus line hereinafter, to which a predetermined positive voltage, such as 5 volts, is applied. The collector of the transistor 184 is connected via a resistor 188 to the first but line $B_1$ while the collector of the same is connected to an input of a NOT gate(inverter) 190. The above-mentioned three resistors 182, 186 and 188, and the transistor 184 constitute the waveform shaper 18, while the NOT gate 190 corresponds to the inverter 19 shown in FIG. 1. The variable resistor 182 is used to adjust the level of the input signal.

The output of the NOT gate 190 is connected via a resistor 202 to a base of a transistor 204 the emitter of which is connected to the first bus line $B_1$. The collector of the transistor 104 is connected to a base of a transistor 210 and is connected to a collector of a transistor 224 via a resistor 206. The base of the transistor 210 is connected via a capacitor 208 to the first bus line $B_1$, while the emitter of the same is connected via a resistor 212 to the first bus line $B_1$. The emitter of the transistor 210 is further connected to a base of a transistor 214 the collector of which is connected to the first bus line $B_1$. The collector of the transistor 210 is connected to ground. The emitter of the transistor 214 is connected via a resistor 216 to ground, while the emitter of the same is connected to an input of a NOT gate 218. The transistor 204, the resistors 202 and 206 and the capacitor 208 constitute the first integrator 20, while the transistors 210 and 214, resistors 212 and 216 and the NOT gate 218 constitute the level detector 21.

The time constant controlling circuit 22 includes the above-mentioned transistor 224 and a resistor 222 interposed between the collector of the transistor 224 and ground. The base of the transistor 224 is connected via a resistor 414 to an output of a NOT gate 412 which will be discussed infra, while the emitter of the same is grounded.

The output of the NOT gate 218 is connected to an input of an INVERT-OR (NOR) gate 242, to an input of the INVERT-OR gate 464, and to an input of an INVERT-OR gate 466. The INVERT-OR gate 242 has another input connected to an output of a NAND gate 244 the first input of which is connected to the output of the INVERT-OR gate 242. The second input of the NAND gate 244 is connected to an output of a NOT gate 246 the input of which is connected to a output of a NAND gate 462. The INVERT-OR gate 242, the NAND gate 244 and the NOT gate 246 constitute the first flip-flop 24.

The output of the NAND gate 244 is connected via a resistor 262 to a base of a transistor 264 the emitter of which is connected to ground. The output of the NAND gate 244 is further connected to the other input of the INVERT-OR gate 466. The collector of the transistor 264 is connected via a resistor 266 to the first bus line $B_1$, while the same collector is directly connected to a base of a transistor 265 the collector of which is connected to the first bus line $B_1$. A capacitor 267 is interposed between the base of the transistor 265 and ground. The emitter of the transistor 265 is connected to a base of a transistor 268 the collector of which is connected to the first bus line $B_1$. The emitter of the transistor 268 is connected to an input of a NOT gate 270 and is connected via a resistor 272 to ground. The transistor 264, the resostors 262 and 266 and the capacitor 267 constitute the second integrator 26, while the transistors 265 and 268, the resistor 272 and the NOR gate 270 constitute the level detector 27.

The output of the NOT gate 270 is connected to an input of an INVERT-OR gate 284 the output of which is connected to an input of a NAND gate 286. The INVERT-OR gate 284 has another input connected to the output of the NAND gate 286, while another input of the NAND gate 286 is connected to an output of a NOT gate 288 the input of which is connected to an output of a NAND gate 468. The INVERT-OR gate 284, the NAND gate 286 and the NOT gate 288 constitute the second flip-flop 28.

The output of the NOT gate 270 is further connected via a resistor 301 to a base of a transistor 310 the emitter of which is connected to ground. The collector of the transistor 310 is connected via a resistor 306 to the first bus line $B_1$, and is directly connected to a base of a transistor 304. A capacitor 308 is interposed between the collector of the transistor 310 and ground. The collector of the transistor 304 is connected to the first bus line $B_1$, while the emitter of the same is connected to a base of a transistor 302 the collector of which is connected to the first bus line $B_1$. The emitter of the transistor 302 is connected to the other input of the INVERT-OR gate 464 and is connected via a resistor 470 to ground. Transistors 310, 304 and 302, the resistors 301, 306 and 470, and the capacitor 308 constitute the delay circuit 30.

The output of the NAND gate 286 is connected via a resistor 382 to a base of a transistor 384 the emitter of which is connected to ground, while the output of the NAND gate 286 is further connected to an input of a NOT gate 412. The collector of the transistor 384 is connected via a resistor 402 to another positive bus line $B_2$ which will be referred to as a second bus line to which a predetermined voltage, such as 30 volts, is applied. A capacitor 386 is interposed between the collector of the transistor 384 and ground, while a series circuit of a resistor 388 and a capacitor 390 is interposed between the collector of the same and a base of a transistor 394 the emitter of which is connected to ground. A diode 382 is interposed between the base of the transistor 384 and ground in a direction that the cathode thereof is connected to the base of the same. The collector of the transistor 384 is further connected via a resistor 398 to a base of a transistor 400 the emitter of which is connected to the collector of the transistor 394. The emitter of the transistor 400 is connected to an anode of a diode 396 the cathode of which is connected to a terminal to which a predetermined voltage such as 15 volts is applied. The collector of the transistor 400 is connected to a movable contact of the second switch $S_2$ which has first and second stationary contacts respectively connected to first and second relays 404 and 406. The first and second relays 404 and 406 respectively cause the tape driving mechanism (not shown) of the tape recorder to establish the fast forward reeling and rewinding (fast reverse reeling) operations when energized. Each of the first and second relays 404 and 406 is connected to the second bus line $B_2$ at its other end.

A series circuit of a third relay 408 and a switch 412 and a series circuit of a fourth relay 410 and a switch 414 are respectively interposed between the second bus line $B_2$ and ground. As shown the switches 412 and 414 are respectively responsive to signals applied from a third switch $S_3$ and a fourth switch $S_4$ which will be described hereinlater. The connection between the third switch $S_3$ and the switch 412 is omitted and is indicated by a reference X, while the connection between the fourth switch $S_4$ and the switch 414 is also omitted and is indicated by a reference Y. The third and fourth relays 408 and 410 respectively cause the tape driving mechanism of the tape recorder to establish the normal playback operation and the pause operation when energized. A terminal G is provided for connecting the common terminals of the circuit shown in FIG. 4 to the ground potential of the power supply (not shown) which supplies the abovementioned predetermined voltages.

The reset circuit 42 includes a third switch $S_3$, first to fourth NOT gates 426, 432, 438 and 439 and resistors and capacitors. The third switch $S_3$ has a movable contact and first and second stationary contacts. The first contact is connected via a resistor 422 to the first bus line $B_1$, while the second contact is connected to ground. The movable contact of the third switch $S_3$ is connected to an input of a NOT gate 426 and is connected via a capacitor 424 to ground. The output of the NOT gate 426 is connected via resistor 428 to an input of a NOT gate 432 and is connected via a capacitor 430 to ground. The output of the NOT gate 432 is connected via a capacitor 434 to an input of a NOT gate 438 and is connected via a resistor 436 to ground. The output of the NOT gate 438 connected to an input of a NAND gate 462 the other input of which is connected to the output of the INVERT-OR gate 464. The output of the NOT gate 438 is further connected to an input of a NOT gate 439 the output of which is connected to reset terminals R of flip-flops 336, 337, 338, 339 and 446. The third switch $S_3$ corresponds to a so-called playback key of the tape recorder and is arranged to be turned on to perform the normal playback operation. As shown, when the third switch $S_3$ is turned on, the movable contact thereof is in contact with the first stationary contact.

The counter 32 includes a fourth switch $S_4$, logic gate circuits 326, 332, 334 and the above mentioned four flip-flops 336, 337, 338 and 339. The fourth switch $S_4$ has a movable contact arranged to contact with first and second stationary contacts. The first stationary contact is connected via a resistor 322 to the first bus line $B_1$, while the second stationary contact is connected to ground. The movable contact of the fourth switch $S_4$ is connected to an input of a NAND gate 332 and is connected via a capacitor 324 to ground. The NAND gate 352 has another input connected via a resistor 330 to ground, while the another input of the same is connected via capacitor 328 to an output of a NOT gate 326 the input of which is connected to the output of the NAND gate 244 included in the first flip-flop 24. The output of the NAND gate 332 is connected to an input of a NOT gate 334 the output of which is connected to a clock pulse terminal CP of the flip-flop 336. The flip-flop 336 has an output Q connected to a clock pulse terminal CP of the next flip-flop 337. In the same manner other flip-flops 338 and 339 are connected in series. Each of the outputs of the flip-flops 336, 337, 338 and 339 is connected to each input of a decoder 342 included in the display circuit 34. The decoder 342 has a plurality of outputs respectively connected to inputs of a display unit 344 such as a seven-segment display device. The fourth switch $S_4$ corresponds to a so-called pause key of the tape player and is arranged to be turned on to make a pause in tape driving operation. As shown, when the fourth switch $S_4$ is turned on, the movable contact thereof is in contact with the second stationary contact.

The search-playback switching circuit 44 includes the first switch $S_1$, a T-type flip-flop 446, two transistors 452, 454, two light-emitting diodes (LED) 458, 462, a capacitor 442 and resistors. The first switch $S_1$ is of a push-button type and has first and second contacts. The first contact is connected via a resistor 444 to the first bus line $B_1$, while the second contact is connected to ground. The capacitor 442 is interposed between the first contact of the first switch $S_1$ and ground. The first contact is further connected to an input T of the T-type flip-flop 446 which has first and second complementary output terminals $\overline{Q}$ and Q. The first output $\overline{Q}$ of the T-type flip-flop 446 is connected via a resistor 448 to a base of a transistor 452 the emitter of which is connected to ground. The collector of the transistor 452 is connected via resistor 456 to a cathode of a first light-emitting diode 458 the anode of which is connected to the first bus line $B_1$. The second output Q of the T-type flip-flop 446 is connected via resistor 450 to a base of a transistor 454 the emitter of which is connected to ground. The collector of the transistor 454 is connected via a resistor 460 to a cathode of a second light-emitting diode 462 the anode of which is connected to the first bus line $B_1$. The second output Q of the T-type flip-flop 446 is further connected to an input of the NAND gate 468 which has another input connected to the output of the INVERT-OR gate 466.

The operation and function of the circuit shown in FIG. 4 will be described hereinafter. The third switch $S_3$ included in the reset circuit 42 is operated (turned on) to start the normal playback operation. When the third switch $S_3$ is activated to the ON position, a pulse, the narrow width pulse width of which is narrow, is produced by the following stage including the NOT gates 426 and 432. The pulse signal is transmitted via the NOT gate 438, the NAND gate 462 and the NOT gate 246 to the first flip-flop 24 so that the first flip-flop 24 is reset. Meanwhile the pulse signal is transmitted via the NOT gate 439 to the reset terminals R of the flip-flops 336, 337, 338, and 339 and to the reset terminal R of the T-type flip-flop 446 so that these five flip-flops are reset.

Consequently, the outputs of the four flip-flops 336 to 339 are of low level and thus the display unit 344 displays a numeral "0" to indicate that the number of pieces of music reproduced by the tape recorder is zero, while the first output $\overline{Q}$ of the T-type flip-flop 446 assumes a high level and thus the first light emitting diode 458 is energized to emit light to indicate that the tape recorder is in the normal playback operation. At this time the second output of the T-type flip-flop 446 assumes a low level and this low level signal is applied to the NAND gate 468. The output of the NAND gate 468 becomes a high level and this high level signal is inverted by the NOT gate 288 having an output applied to the second flip-flop 28. The second flip-flop 28 is reset with the signal from the NOT gate 288 and thus the output of the NAND gate 286 is of a high level. In response to the high level signal at the output of the NAND gate 286, the transistor 384 included in the driving circuit 38 becomes conductive so that base bias currents of the transistors 400 and 394 are cut off. Transistors 400 and 394 become nonconductive and thus no electric current flows via the first relay 404. In the above it is assumed that the second switch $S_2$ is set to connect the movable contact thereof to the first contact connected to the first relay 404. In response to an electrical current flowing through the first relay 404, the fast forward reeling is not performed, while the normal playback operation is maintained as will be described infra.

Turning back to the third switch $S_3$ (playback switch), when the third switch $S_3$ is turned on, the voltage applied from the first bus line $B_1$ via the resistor 422 is applied to the switch 412, via the connection shown by X, included in the driving circuit 38. The switch 412 closes in response to the voltage applied from the third switch $S_3$ and thus an electrical current flows via the third relay 408 so that the normal playback (reproduction) operation starts. As mentioned hereinabove since the first relay 404 is not energized, the normal playback operation is maintained.

The high level signal of the output of the NAND gate 286 is inverted into a low level signal by the NOT gate 402 and is applied to the base of the transistor 224 included in the time constant control circuit 22. The transistor 224 becomes nonconductive so that the resistance between the collector of the transistor 204 included in the first integrator 20 equals the sum of the resistances of the resistors 206 and 222. Namely, the time constant of the first integrator 20 is changed from the first time constant such as 0.1 second to the second time constant such as two seconds.

If the listener wishes to listen to all pieces of music prerecorded on the magnetic tape, the listener may listen to the reproduced music without operating any switches. When the listener wishes to search a specific piece of music among a plurality of pieces of music, he or she operates the first switch $S_1$ included in the search-playback switching circuit 44. When the first switch $S_1$ temporarily closes, a pulse signal is fed to the input T of the T-type flip-flop 446 and thus the output signals of the same are inverted. Namely, the second output of the T-type flip-flop 446 turns to a high level and thus the transistor 454 becomes conductive to energize the second light-emitting diode 462 which indicates that the search operation is performed. At this time the first light-emitting diode 456 is OFF.

Audio signals recorded on the magnetic tape are reproduced by suitable amplifiers included in the tape recorder, while the reproduced signals of the both (left and right) channels are applied to the input terminals 10 and 12. The audio signals are detected respectively by the diodes 142, 144, 146 and 148, and the detected signals of the left and right channel are added (mixed). The added signal is applied via the variable resistor 182 to the base of the transistor 184 included in the waveform shaper 18. When the magnitude of the added signal exceeds a predetermined value, the transistor 184 becomes nonconductive and thus the voltage at the collector of the transistor rises from a low level to a high level. The high level signal is inverted by the NOT gate 188 into a low level signal to be applied to the base of the transistor 204 included in the first integrator 20. Therefore, the transistor 204 becomes conductive and the output of the NOT gate 218 is maintained at a low level unless no input signal is applied to the integrator 20 for over two seconds because of the time constant of the integrator 20.

When the output of the NOT gate 218 becomes to a low level, the first flip-flop 24 is set so that the output of the NAND gate 244 included in the first flip-flop 24 assumes a low level. The low level signal is fed via the NOT gate 326 included in the counter 32, and the capacitor 328 to the NAND gate 332 in the form of a high level signal. Since the NAND gate 332 receives a high level signal at the other input from the fourth switch $S_4$ which assumes the OFF position normally, the NAND gate 332 produces an output signal of a low level. This low level signal is inverted by the NOT gate 334 into a high level signal to be applied to the clock pulse input CP of the flip-flop 336. The pulse signal applied from the NOT gate 334 is counted by the flip-flop 336 and thus the display unit 344 displays a numeral "1" to indicate that the first piece of music is now reproduced. The decoder 342 interposed between the outputs of the flip-flops 336 to 339 and the display unit 344 is used to decode the binary signals derived from the flip-flops 336 to 339 so as to energize the display unit such as well known seven-segment display device. Simultaneously, the low level signal from the NOT gate 244 is fed to the base of the transistor 264 included in the second integrator 26. The transistor 264 becomes nonconductive upon absence of a base bias current and thus the output of the NOT gate 270 assumes a low level about ten seconds after the transistor 264 becomes nonconductive.

The low level signal from the output of the NOT gate 270 is applied to an input of the INVERT-OR gate 284 of the second flip-flop 28 so as to set the same. Namely, the output of the NAND gate 286 assumes a low level and this low level signal is supplied to the base of the transistor 384 included in the driving circuit 38. The transistor 384 becomes nonconductive and thus bias currents are respectively fed to the transistors 400 and 394. The transistors 400 and 394 become conductive to complete the first relay 404 circuit. The first relay 404 is energized so that the fast forward reeling operation starts. It will be understood therefore, that the normal playback operation is maintained for about ten seconds after the first switch $S_1$ is operated and at the end of the period of time of ten seconds, the tape driving operation is changed from the normal playback operation to the fast forward driving. The time at which the driving modes are changed is indicated by time $t_1$ in FIG. 2.

When the output of the NAND gate 286 of the second flip-flop 28 assumes a low level, the low level signal is inverted by the NOT gate 402 into a high level signal and the high level signal is applied via the resistor 404 to the base of the transistor 224 included in the time constant controlling circuit 22. Accordingly, the transistor 224 turns conductive so as to electrically connect the junction between the two resistors 206 and 222 to ground. With this operation, the resistance between the collector of the transistor 204 and ground equals the resistance of the resistor 206 and thus the time constant of the first integrator 20 changes from two seconds to 0.1 second. Further, in response to a low level signal at the output of the NOT gate 270, the bias current is not applied to the base of the transistor 310 included in the delay circuit 30 so that the transistor 310 becomes nonconductive. The output of the transistor 302 also included in the delay circuit 30 assumes a high level with a predetermined time delay (two seconds). The high level output signal obtained at the emitter of the transistor 302 is fed to the INVERT-OR gate 464. At this time, if the output of the NOT gate 218 is of a low level, viz. upon presence of the input signal derived from the magnetic tape, the low level signal is applied to the other input of the INVERT-OR gate 464 so as to produce a high level signal at the output of the INVERT-OR gate 464. The high level signal is applied to an input of the NAND gate 462, while another high level signal is applied from the NOT gate 438 to the other input of the NAND gate 462. The NAND gate produces a low level signal which is inverted by the NOT gate 246 and is applied to the NAND gate 244 of the first flip-flop 24. Therefore, the first flip-flop 24 is maintained at the set condition. The fast forward driving operation is therefore, maintained.

After a piece of music no signal portion is detected. When no signal is applied to the input terminals 10 and 12 for more than 0.1 second, the NOT gate 218 included in the level detector 21 produces a high level output signal which is fed to the INVERT-OR gate 464. Both of the inputs of the INVERT-OR gate 464 receive high level signals respectively to produce a low level signal at the output thereof. The low level signal is applied via the NAND gate 462 and NOT gate 246 to the NAND gate 244 of the first flip-flop 24 so as to reset the first flip-flop 24. The output of the NAND gate 244 of the first flip-flop 24 assumes a high level and the high level signal is transmitted via the INVERT-OR gate 466, the NAND gate 468 and NOT gate 288 to the NAND gate 286 of the second flip-flop 28 so as to reset the second flip-flop 28. The output of the NAND gate 286 turns to a high level and thus the transistor 384 included in the driving circuit 38 becomes conductive. The transistors 400 and 394 turn nonconductive and thus the first relay 404 is not energized. Accordingly, the fast forward reeling operation ends and the driving modes are changed to the normal playback operation again. The time at which the normal playback operation is reestablished is indicated by a reference time $t_4$ in FIG. 2. The audio signals prerecorded on the magnetic tape are reproduced at the normal playback speed so as to make it possible for the listener to ascertain whether the music piece reproduced is the specific one that he or she wishes to listen to.

In the above operation, it will be noted that if the output of the NOT gate 218 of the level detector 21 becomes to a high level upon absence of the input signals within two seconds after the output of the NOT gate 270 of the level detector 27 becomes a low level, the first flip-flop 24 is not reset since the emitter of the transistor 302 included in the delay circuit 30 assumes a low level for two seconds after the NOT gate 270 output signal becomes low level. Consequently, the high speed reproduction in the fast forward driving operation is maintained.

When a piece of music that the listener wishes to listen to is reproduced, the listener operates the first switch $S_1$ again. The T-type flip-flop 446 is set so that the second flip-flop 28 is maintained at the reset condition. Therefore, the listener can continuously listen to the selected piece of music at the normal playback speed from the beginning to the end of the music.

Although in the above described operation, it is assumed that the second switch $S_2$ included in the driving circuit 38 is turned to be connected to the first relay 404 which causes the tape recorder to drive the magnetic tape with the fast forward reeling, the second switch $S_2$ may be turned in opposite direction so as to connect the second relay 406 to the collector of the transistor 400. When the second switch $S_2$ establishes the connection between the collector of the transistor 400 and the second relay 406, the search of a piece of music is performed in a direction from the end of the magnetic tape toward the beginning of the tape. Of course the reproduction of the audio signals is performed for ten seconds in a right direction, i.e. from the beginning of a piece of music toward the end thereof, while the remaining portion of the piece of music other than the portion which is reproduced at the normal playback speed, are skipped at high speed in the reverse direction as described hereinbefore in connection with FIG. 3.

The fourth switch S4 is provided to make a pause in the reeling operation of the magnetic tape as mentioned hereinbefore. When the magnetic tape is stopped at the middle of a piece of music, no signals are picked up by the reproduce head of the tape recorder so that no input signal is applied to the input terminals 10 and 12. The period of time for which no signal is applied to the input terminals 10 and 12 is detected as the no signal portion between two pieces of music. When the playback operation starts again after the pause, the reproduced audio signals cause the NOT gate 218 included in the level detector 21 to produce a low level signal which may be counted by the counter 32 as a pulse which indicates a piece of music. However, the pulse signal from the NOT gate 218 is not applied to the flip-flop 336 unless the NAND gate 332 receives a high level signal from the fourth switch S4. When a pause is made by operating the fourth switch S4, the movable contact of the fourth switch S4 is in contact with a terminal connected to ground and therefore, a low level signal is fed to one input of the NAND gate 332. Consequently, the pulse applied from the capacitor 328 is not transmitted to the flip-flop 336 since the pulse is blocked by the NAND gate 332 and therefore, the flip-flop 336 does not count the pulse. The displayed number at the display unit 344 does not change. In other words, a pause during a normal playback operation does not cause the counter to erroneously count the number of pieces of music because of the circuit arrangement of the counter 32.

Although in the above described embodiment of the apparatus for searching a piece of music, the listener listens to each initial portion of pieces of music to see whether the reproduced music is the one that he or she wishes to listen to, the apparatus may be used to select a specific piece of music by counting the number of pieces. The operator presets a number, corresponding to a piece of music that he or she wishes to listen to, into a digital comparator (not shown) in which the number indicated by the output signal of the counter 32 is compared with the present number. The magnetic tape is driven at high speed until the very initial portion of the specific piece of music is detected. From the initial portion of the specific piece of music the tape is driven at normal playback speed.

Obviously many modifications and variations of the present invention are possible in the light of the above teachings. It is therefore to be understood that within the scope of the appended claims the invention may be practised otherwise than as specifically described.

What is claimed is:

1. An apparatus for searching for a piece of information prerecorded on a magnetic tape, the information being reproduced by a tape player including a tape drive mechanism and reproducing means, said apparatus comprising:
   (a) means responsive to signals reproduced from the magnetic tape for deriving first and second signals respectively indicative of initial and end portions of each piece of information;
   (b) delay means responsive to the first signal for delaying said first signal by a predetermined interval;
   (c) means for assuming a first stable state in response to the output signal of said delay means and a second stable state in response to said second signal;
   (d) means for changing the reeling speed of said tape player from a normal playback speed to a high speed in response to said first stable state of said third mentioned means, and from said high speed to said normal playback speed in response to said second stable state of said third mentioned means; and
   (e) switching means for maintaining the normal playback operation of said tape player.

2. An apparatus as claimed in claim 1, wherein said first and second signal producing means comprises:
   (a) level detector means responsive to reproduced signals from said reproducing means;
   (b) waveform shaping means responsive to the output signal of said level detecting means for producing an output signal when the magnitude of the output signal of said level detecting means is above a predetermined level; and
   (c) integrating means responsive to the output signal of said waveform shaping means.

3. An apparatus as claimed in claim 1, wherein said delay means comprises:
   (a) a flip-flop arranged to be set by said first signal;
   (b) an integrator responsive to the output signal of said flip-flop; and
   (c) a delay circuit responsive to the output signal of said integrator, said flip-flop being arranged to be reset by the output signal of said delay circuit.

4. An apparatus as claimed in claim 2, further comprising a time constant control circuit for changing the time constant of said integrator in accordance with the reeling speeds.

5. An apparatus as claimed in claim 1, wherein said reeling speed changing means comprises means for causing the tape recorder to perform the normal playback operation and means for activating the tape player into high speed playback operation.

6. An apparatus as claimed in claim 5, wherein said reeling speed changing means further comprises switching means for selecting one of:
   (a) high speed forward drive; and
   (b) the rewinding for high speed playback.

7. An apparatus as claimed in claim 1, further comprising: counting means responsive to said first signal for producing a signal indicative of the number of the pieces of information; and means responsive to the output signal of said counting means for visually display said number.

8. An apparatus as claimed in claim 7, further comprising: a pause switch means having off and on positions; and gate circuit means responsive to said pause switch means for transmitting said first signal to said counting means only when said pause switch means is in its off position.

9. An apparatus as claimed in claim 1, further comprising: means for indicating that the tape player is in the search mode during which the normal playback and a high speed are alternatively repeated.

10. An apparatus as claimed in claim 1, further comprising: means for indicating that the tape player is in the normal playback operation only when the normal playback operation is continuously performed.

11. A tape recording and reproducing apparatus comprising:
   (a) tape drive means for reeling a magnetic tape at a normal playback speed and a speed higher than said normal playback speed;
   (b) reproducing means for retrieving information prerecorded on said magnetic tape;

(c) means responsive to signals reproduced from the magnetic tape for deriving a first and second signals respectively indicative of initial and end portions of each piece of information;

(d) delay means responsive to the first signal delaying said first signal by a predetermined interval;

(e) means responsive to the output signal of said delay means for causing said tape drive means to drive said magnetic tape at said higher speed;

(f) means responsive to said second signal for causing said tape drive means to drive said magnetic tape at said normal playback speed; and (g) manually operable switching means for causing said tape drive means to maintain said normal playback speed.

12. A method of determining if a particular piece on a magnetic recording medium is to be played back or not, the medium including a plurality of pieces having starting locations randomly positioned and spaced along the length of the medium, each piece being represented by magnetic flux variations on the medium, the medium having none of the magnetic flux variations between the end of each piece and the beginning of the next piece, comprising playing back successive pieces from the medium at higher speed than can be perceived by an operator, from each piece played back at the higher speed sensing when a magnetic flux transition to none of the flux variations occurs between the end of each piece and the beginning of the next piece, in response to the sensed transition reducing the speed of the medium to a normal playback speed for the operator, maintaining the normal playback speed for a predetermined interval at the beginning of the next piece, said interval being long enough to enable the operator to make a decision regarding the next piece, and then, when the interval is completed, normally automatically resuming high speed playback until the completion of the next piece.

13. The method of claim 12 further including the step of selectively playing the next piece back at normal speed by energizing a switch prior to completion of the predetermined interval.

14. The method of claim 12 wherein the sensed transition has a period in excess of pauses in the pieces.

* * * * *